United States Patent
Kuehner et al.

(10) Patent No.: US 11,851,084 B2
(45) Date of Patent: Dec. 26, 2023

(54) SYSTEMS AND METHODS FOR CONTROLLING AN AUTONOMOUS VEHICLE

(71) Applicant: Toyota Research Institute, Inc., Los Altos, CA (US)

(72) Inventors: Manuel Ludwig Kuehner, Mountain View, CA (US); Daniel J. Brooks, Arlington, MA (US); Hiroshi Yasuda, San Francisco, CA (US); Jaime Camhi, San Jose, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 382 days.

(21) Appl. No.: 17/232,524

(22) Filed: Apr. 16, 2021

(65) Prior Publication Data
US 2022/0332343 A1 Oct. 20, 2022

(51) Int. Cl.
*B60W 10/20* (2006.01)
*B60W 60/00* (2020.01)
(Continued)

(52) U.S. Cl.
CPC .......... *B60W 60/001* (2020.02); *B60W 10/20* (2013.01); *B60W 30/09* (2013.01);
(Continued)

(58) Field of Classification Search
CPC .... B60W 60/001; B60W 10/20; B60W 30/09; B60W 30/0956; B60W 30/10;
(Continued)

(56) References Cited

U.S. PATENT DOCUMENTS 8,781,670 B2 7/2014 Dolgov et al.
10,421,465 B1 * 9/2019 Jutkowitz ............ G05D 1/0061
(Continued)

FOREIGN PATENT DOCUMENTS

JP 2007099237 A * 4/2007

OTHER PUBLICATIONS

L. Claussmann et al., "A Path Planner for Autonomous Driving on Highways Using a Human Mimicry Approach with Binary Decision Diagrams," 2015, found at https://www.researchgate.net/profile/Ashwin_Carvalho/publication/280002474_A_path_planner_for_autonomous_driving_on_highways_using_a_human_mimicry_approach_with_Binary_Decision_Diagrams/links/55a2dddd08aea54aa8156d7f/A-path-planner-for-autonomous-driving-on-highways-using-a-human-mimicry-approach-with-Binary-Decision-Diagrams.pdf +.

(Continued)

*Primary Examiner* — Donald J Wallace
*Assistant Examiner* — Daniel M. Robert
(74) *Attorney, Agent, or Firm* — Christopher G. Darrow; Darrow Mustafa PC

(57) ABSTRACT

Systems and methods for controlling an autonomous vehicle are disclosed herein. One embodiment determines a reference path for the autonomous vehicle along a roadway segment and steers the autonomous vehicle along a path that includes controlled back and forth lateral deviations from the reference path along the roadway segment to provide feedback to an occupant of the autonomous vehicle, the feedback indicating to the occupant that the autonomous vehicle is in an autonomous driving mode and that the autonomous driving mode is operating correctly.

17 Claims, 6 Drawing Sheets

(51) Int. Cl.
  *B60W 50/14* (2020.01)
  *B60W 30/09* (2012.01)
  *B60W 30/14* (2006.01)
  *B60W 30/10* (2006.01)
  *B60W 40/08* (2012.01)
  *B60W 30/095* (2012.01)
  *B60W 10/04* (2006.01)
  *B60W 10/18* (2012.01)

(52) U.S. Cl.
  CPC ........ *B60W 30/0956* (2013.01); *B60W 30/10* (2013.01); *B60W 30/143* (2013.01); *B60W 40/08* (2013.01); *B60W 50/14* (2013.01); *B60W 10/04* (2013.01); *B60W 10/18* (2013.01)

(58) Field of Classification Search
  CPC .... B60W 30/143; B60W 40/08; B60W 50/14; B60W 10/04; B60W 10/18; B60W 30/12; B60W 60/00; B60W 50/0097; B60W 50/08; B60W 2050/146; B60W 2554/80; B60W 2555/60; G05D 1/0212; G05D 1/0088; G05D 2201/0213; G01C 21/3676; B60K 2370/119; B60K 2370/16; B60K 2370/166; B60K 2370/175; B60K 2370/186; B60K 2370/191; B60K 2370/193
  See application file for complete search history.

(56) References Cited

U.S. PATENT DOCUMENTS

| | | | | |
|---|---|---|---|---|
| 2015/0166069 | A1* | 6/2015 | Engelman | B60W 30/16 701/23 |
| 2017/0021830 | A1* | 1/2017 | Feldman | B60W 30/16 |
| 2018/0093663 | A1* | 4/2018 | Kim | G08G 1/166 |
| 2018/0201254 | A1* | 7/2018 | Myers | G05D 1/0088 |
| 2018/0319407 | A1* | 11/2018 | Lisseman | B60W 50/14 |
| 2019/0187706 | A1 | 6/2019 | Zhou et al. | |
| 2020/0122721 | A1* | 4/2020 | Zhang | B60W 60/00274 |
| 2020/0377082 | A1* | 12/2020 | Nassouri | B60W 30/0956 |
| 2021/0107500 | A1* | 4/2021 | Kalabic | B60W 50/10 |
| 2022/0135165 | A1* | 5/2022 | Tamashima | B60W 10/18 701/96 |
| 2022/0258728 | A1* | 8/2022 | Heirung | B60W 30/09 |

OTHER PUBLICATIONS

D. Xu et al., "Learning from Naturalistic Driving Data for Human-Like Autonomous Highway Driving," arXiv:2005.11470v1, May 23, 2020, found at https://arxiv.org/pdf/2005.11470.pdf ("Xu").

S. Dominguez et al., "Comparison of Lateral Controllers for Autonomous Vehicle: Experimental Results," 2016 IEEE 19th International Conference on Intelligent Transportation Systems (ITSC 2016), Nov. 2016, Rio de Janeiro, Brazil, found at https://hal.inria.fr/hal-02440161/file/ITSC16salvador.pdf.

L. Oliveira et al., "Driving Style: How Should an Automated Vehicle Behave?", Information 2019, found at https://www.mdpi.com/2078-2489/10/6/219/pdf.

C. Wei et al., "Risk-Based Autonomous Vehicle Motion Control with Considering Human Driver's Behaviour," Elsevier, 2019, found at http://eprints.whiterose.ac.uk/150669/1/TRC-automation.pdf.

D. Xu et al., "Naturalistic Lane Change Analysis for Human-Like Trajectory Generation," 2018 IEEE Intelligent Vehicles Symposium (IV) Changshu, Suzhou, China, Jun. 26-30, 2018, found at https://ieeexplore.ieee.org/abstract/document/8500690.

* cited by examiner

SYSTEMS AND METHODS FOR CONTROLLING AN AUTONOMOUS VEHICLE

TECHNICAL FIELD

The subject matter described herein generally relates to vehicles and, more particularly, to systems and methods for controlling an autonomous vehicle.

BACKGROUND

One of the challenges the automotive industry faces in introducing autonomous vehicles is getting consumers to accept such vehicles and trust that they are reliable and safe. Another challenge is that, in some situations, an occupant of an autonomous vehicle might be uncertain whether the vehicle is truly operating in an autonomous driving mode.

SUMMARY

An example of a system for controlling an autonomous vehicle is presented herein. The system comprises one or more processors and a memory communicably coupled to the one or more processors. The memory stores a path-planning module including instructions that when executed by the one or more processors cause the one or more processors to determine a reference path for the autonomous vehicle along a roadway segment. The memory also stores a feedback-generation module including instructions that when executed by the one or more processors cause the one or more processors to steer the autonomous vehicle along a path that includes controlled back and forth lateral deviations from the reference path along the roadway segment to provide feedback to an occupant of the autonomous vehicle, the feedback indicating to the occupant that the autonomous vehicle is in an autonomous driving mode and that the autonomous driving mode is operating correctly.

Another embodiment is a non-transitory computer-readable medium for controlling an autonomous vehicle and storing instructions that when executed by one or more processors cause the one or more processors to determine a reference path for the autonomous vehicle along a roadway segment. The instructions also cause the one or more processors to steer the autonomous vehicle along a path that includes controlled back and forth lateral deviations from the reference path along the roadway segment to provide feedback to an occupant of the autonomous vehicle, the feedback indicating to the occupant that the autonomous vehicle is in an autonomous driving mode and that the autonomous driving mode is operating correctly.

In another embodiment, a method of controlling an autonomous vehicle is disclosed. The method comprises determining a reference path for the autonomous vehicle along a roadway segment. The method also includes steering the autonomous vehicle along a path that includes controlled back and forth lateral deviations from the reference path along the roadway segment to provide feedback to an occupant of the autonomous vehicle, the feedback indicating to the occupant that the autonomous vehicle is in an autonomous driving mode and that the autonomous driving mode is operating correctly.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Figure 1:
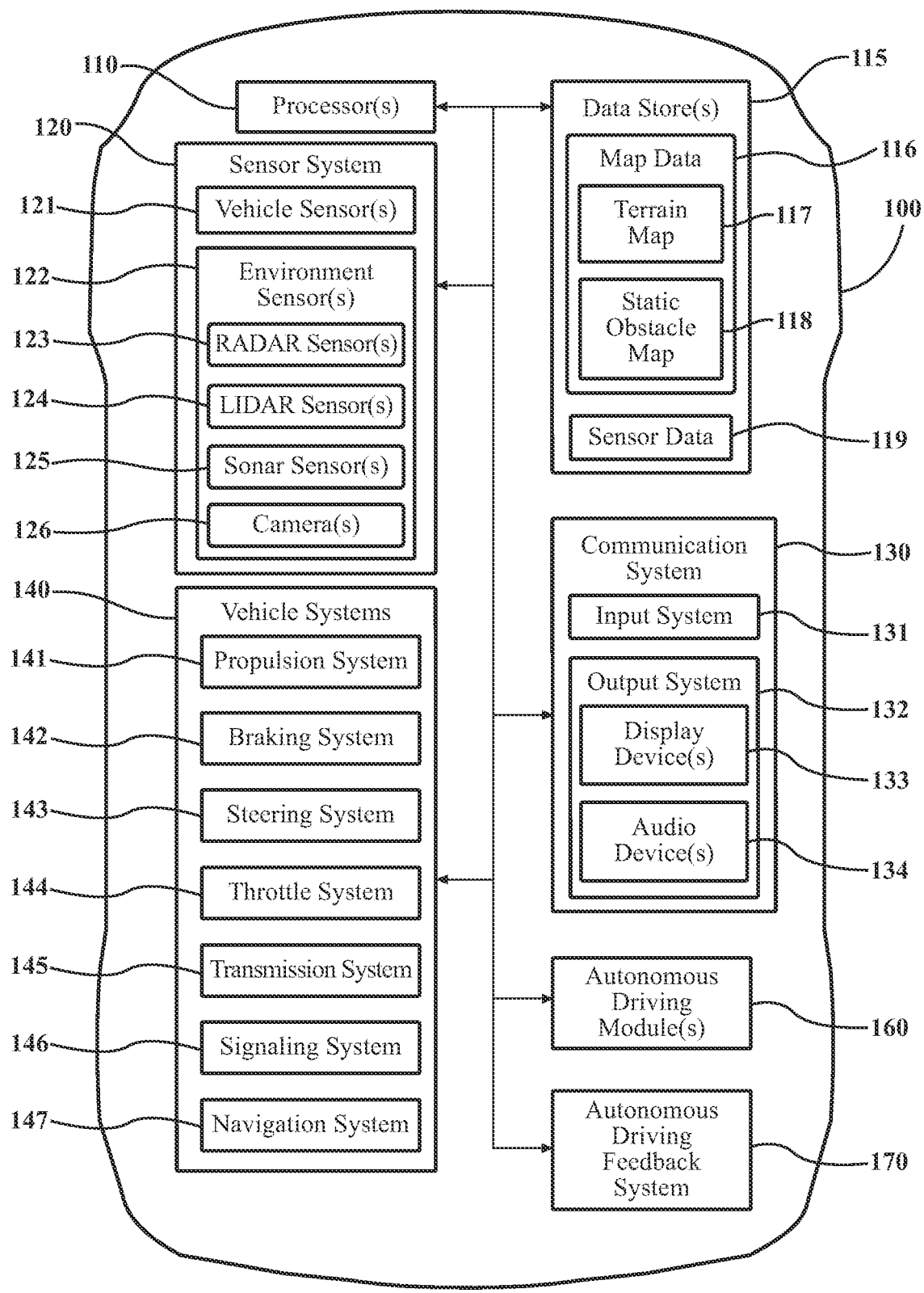
FIG. 1 illustrates one embodiment of a vehicle within which systems and methods disclosed herein may be implemented.

Various embodiments of an autonomous driving feedback system described herein increase trust, confidence, and awareness of the current system status associated with autonomous driving. Increasing a vehicle owner's or operator's confidence in the vehicle's autonomous-driving system helps to prevent premature or unnecessary handover of control to a human owner/operator.

One principle underlying the embodiments described herein is the observation that human drivers normally "zig-zag" (weave back and forth) at least slightly even along a perfectly straight roadway segment due to the limitations of human sensory systems. Consequently, an autonomous vehicle that travels perfectly straight along a straight roadway segment can feel unnatural to an occupant of the autonomous vehicle. This feeling of unnaturalness may even cause the occupant to doubt whether the vehicle is truly operating in an autonomous driving mode, forcing the occupant to rely on instrument-panel lights, icons, audible tones, or other indicators to ascertain the status of the vehicle's autonomous driving system.

In various embodiments, an autonomous driving feedback system in a vehicle determines a reference path for the autonomous vehicle along an upcoming roadway segment. In some embodiments, the reference path coincides, at least approximately, with a line that extends longitudinally along the center of the lane in which the vehicle is traveling. Such a reference path may be termed a "normal" or "ideal" path or trajectory for the vehicle to follow over the course of the roadway segment. In various embodiments, the autonomous driving feedback system autonomously steers the vehicle along a path that includes controlled back and forth lateral deviations from the reference path along the roadway segment. This provides feedback to an occupant of the autonomous vehicle, the feedback indicating to the occupant that the autonomous vehicle is in an autonomous driving mode and that the autonomous driving mode is operating correctly. Thus, intentional, controlled lateral (side to side) imperfections in the vehicle's traveled trajectory provide vehicle occupants with feedback that increases trust and makes the vehicle occupants aware of the status of the autonomous-driving system in the vehicle (i.e., that the system is engaged and working correctly).

The feedback a vehicle occupant experiences can be of two types. First, the occupant can see visually that the vehicle is slowly "zig-zagging" or weaving back and forth somewhat toward one lane boundary and then the other. Second, the occupant can feel slight g-forces due to the subtle back-and-forth lateral movement of the vehicle as it proceeds along the roadway segment. These visual and kinesthetic (in combination with the vestibular system) forms of feedback can help to reassure the occupant that the vehicle is operating in an autonomous driving mode and that the vehicle is operating correctly in that mode. Of course, a blind vehicle occupant will experience only kinesthetic (in combination with the vestibular system) feedback.

Referring to FIG. 1, an example of an autonomous vehicle 100 (hereinafter, "vehicle 100"), in which systems and methods disclosed herein can be implemented, is illustrated. As used herein, a "vehicle" is any form of motorized transport. In one or more implementations, the vehicle 100 can be an automobile. Vehicle 100 can operate, at least some of the time, in a fully autonomous mode—what is referred to, under the Society of Automotive Engineers (SAE) autonomy nomenclature, as autonomy Levels 3-5, particularly Level 5. The vehicle 100 can include an autonomous driving feedback system 170 or capabilities to support or interact with the autonomous driving feedback system 170 and thus benefits from the functionality discussed herein. Instances of vehicle 100, as used herein, are equally applicable to any device capable of incorporating the systems or methods described herein.

The vehicle 100 also includes various elements. It will be understood that, in various implementations, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1, including autonomous driving feedback system 170. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described in connection with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Sensor system 120 can include one or more vehicle sensors 121. Vehicle sensors 121 can include one or more positioning systems such as a dead-reckoning system or a global navigation satellite system (GNSS) such as a global positioning system (GPS). Vehicle sensors 121 can also include vehicle-bus sensors that output, for example, speed and steering-angle data pertaining to vehicle 100. Sensor system 120 can also include one or more environment sensors 122. Environment sensors 122 can include radar sensor(s) 123, Light Detection and Ranging (LIDAR) sensor(s) 124, sonar sensor(s) 125, and camera(s) 126. One or more of these various types of environment sensors 122, the one or more positioning systems, and map data 116 can be used in localization, navigation, and path planning. The environment sensors 122 can also be used to detect and recognize objects (e.g., other vehicles, pedestrians, cyclists, animals, obstacles, construction equipment, construction barriers, etc.) in the environment external to vehicle 100.

To control and direct autonomous driving, vehicle 100 includes autonomous driving module(s) 160, which operate in conjunction with various vehicle systems 140 such as propulsion system 141, steering system 143, braking system 142, and navigation system 147.

Figure 2:
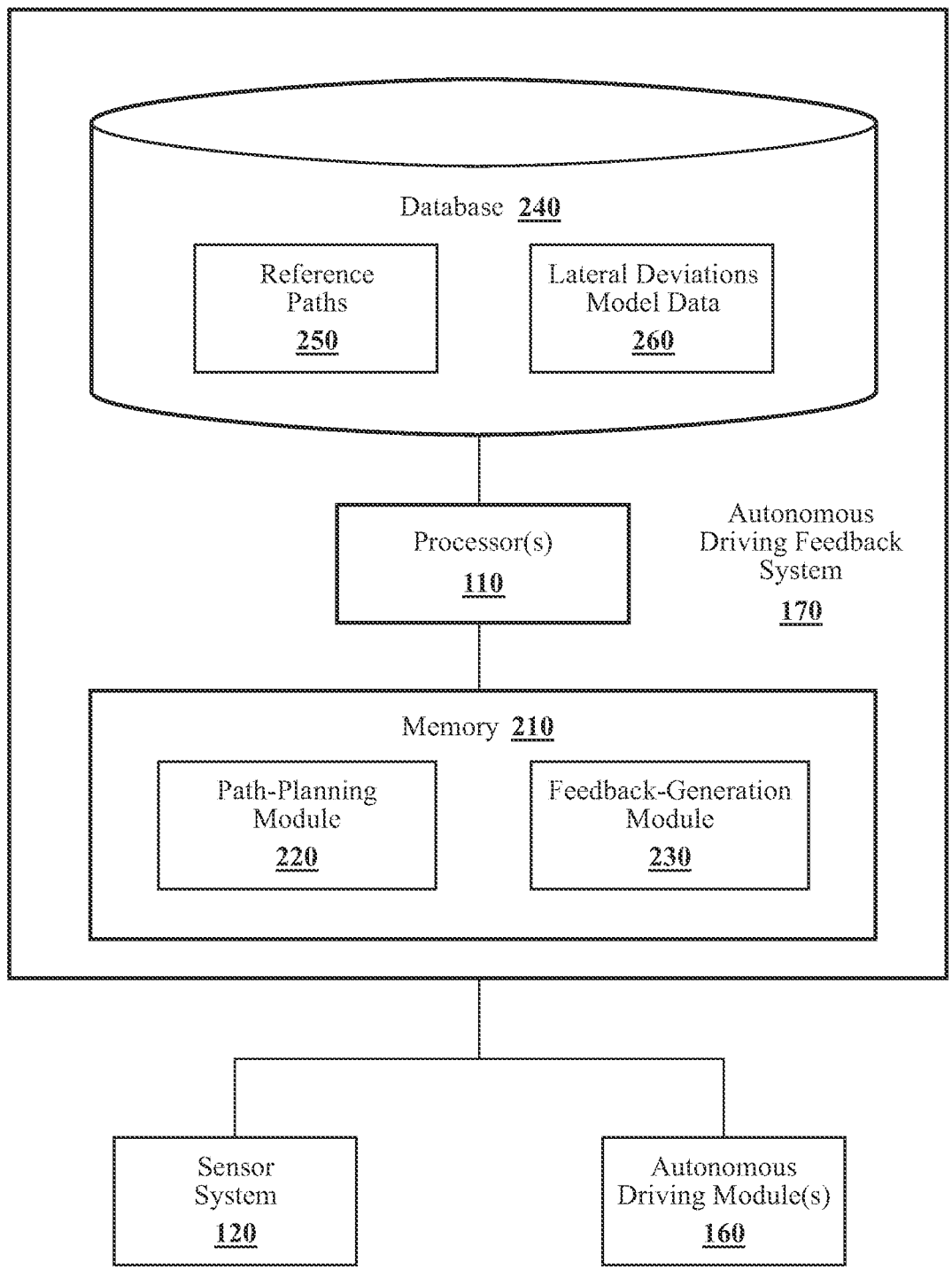
FIG. 2 is a functional block diagram of an autonomous driving feedback system, in accordance with an illustrative embodiment of the invention.

Referring to FIG. 2, it is a functional block diagram of an autonomous driving feedback system 170, in accordance with an illustrative embodiment of the invention. In this embodiment, autonomous driving feedback system 170 is shown as including one or more processors 110 from the vehicle 100 of FIG. 1. In general, the one or more processors 110 may be a part of autonomous driving feedback system 170, autonomous driving feedback system 170 may include one or more separate processors from the one or more processors 110 of the vehicle 100, or autonomous driving feedback system 170 may access the one or more processors 110 through a data bus or another communication path, depending on the embodiment.

In one embodiment, memory 210 stores a path-planning module 220 and a feedback-generation module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the one or more processors 110, cause the one or more processors 110 to perform the various functions disclosed herein.

As shown in FIG. 2 and as discussed above, autonomous driving feedback system 170 can interface and communicate with sensor system 120 and autonomous driving module(s) 160. More specifically, autonomous driving feedback system 170 can at least indirectly control the operation of vehicle 100 by conveying its feedback-related output downstream to the autonomous driving module(s) 160, which ultimately control the steering, acceleration, and braking, etc., of the vehicle 100 (refer to vehicle systems 140 in FIG. 1).

Autonomous driving feedback system 170 can store reference paths 250 and lateral deviations model data 260 in a database 240. Lateral deviations model data 260 can include a variety of different kinds of data, intermediate results of calculations, etc., associated with generating the controlled back and forth lateral deviations from a reference path discussed above. As also discussed above, autonomous driving feedback system 170 can also accesses HD map data 116 in connection with localization and path planning (e.g., determining reference paths 250 and planning a path augmented by the controlled back and forth lateral deviations).

Path-planning module 220 generally includes instructions that when executed by the one or more processors 110 cause the one or more processors 110 to determine a reference path for the autonomous vehicle along a roadway segment. As discussed above, in some embodiments the reference path coincides, at least approximately, with an imaginary line that extends longitudinally along the center of the lane in which the vehicle is traveling—at least for roadway segments that are straight or approximately straight. It should be noted that when a roadway includes curves, the reference path might not necessarily be along the exact longitudinal center of the lane for the portions of the roadway segment that include curves, though it could be, in some embodiments. As described herein, a reference path may be termed the "normal" or "ideal" path or trajectory for the vehicle to follow over the course of the roadway segment. In this description, the terms "path" and "trajectory" are used interchangeably. The concept of a reference path is illustrated in FIG. 3.

Figure 3:
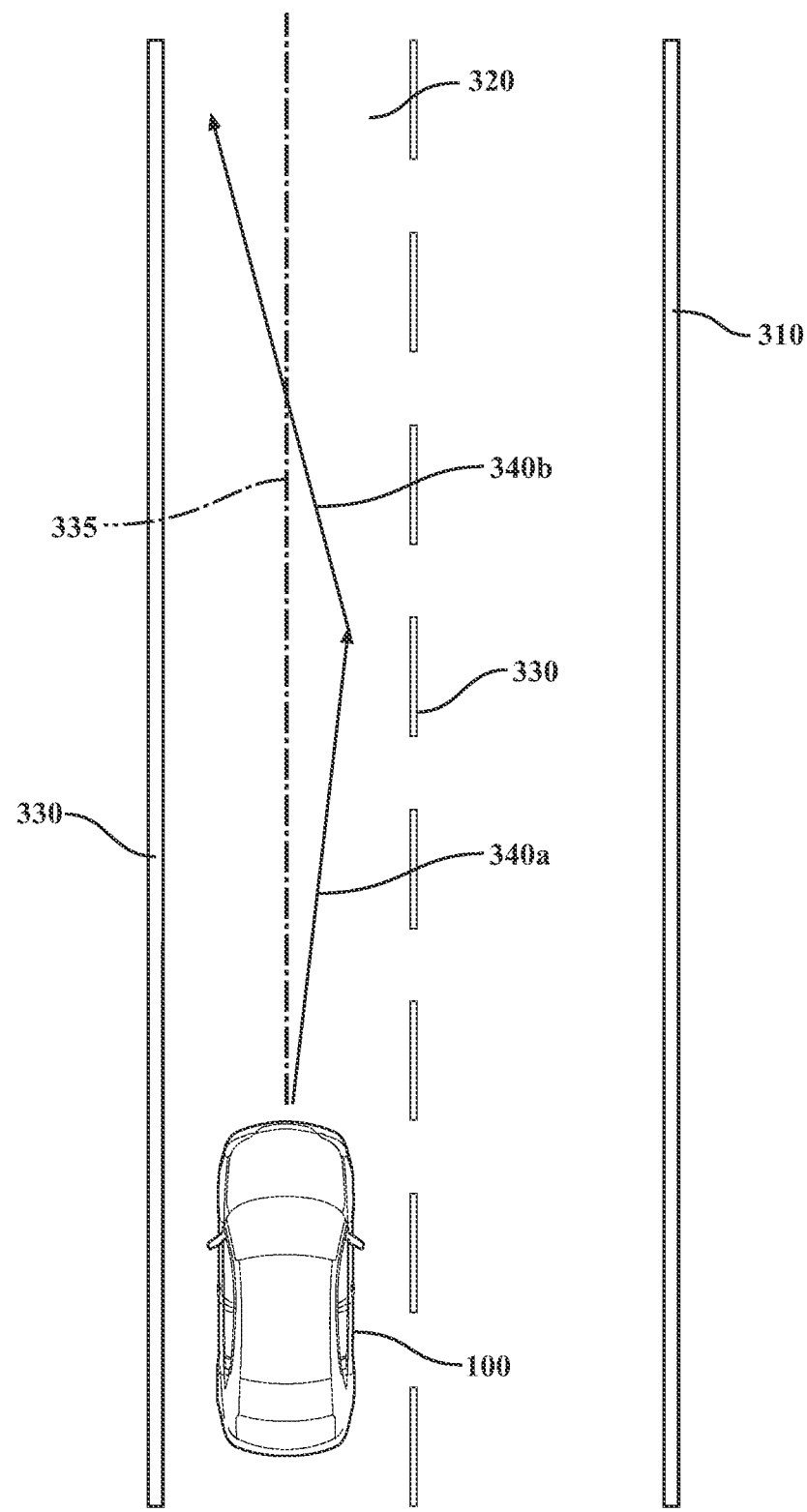
FIG. 3 illustrates controlled back and forth lateral deviations relative to a reference path, in accordance with an illustrative embodiment of the invention.

FIG. 3 illustrates controlled back and forth lateral deviations 340 relative to a reference path 335, in accordance with an illustrative embodiment of the invention. In the scenario depicted in FIG. 3, vehicle 100 is traveling in the left lane 320 of a roadway 310. The lane 320 is delineated by left and right lane lines 330. Based on the environment sensors (cameras 126, LIDAR sensors 124, etc.) and/or map data 116, path-planning module 220 can analyze an upcoming roadway segment along roadway 310 and determine, in this example, that the roadway segment is at least approximately straight. Path-planning module 220 can also determine a reference path 335 along the roadway segment, as illustrated in FIG. 3. FIG. 3 will be discussed further below in connection with feedback-generation module 230.

Feedback-generation module 230 generally includes instructions that when executed by the one or more processors 110 cause the one or more processors 110 to steer the vehicle 100 along a path that includes controlled back and forth lateral deviations 340 from the reference path 335 along the roadway segment to provide feedback to an occupant of vehicle 100. The visual and kinesthetic (in combination with the vestibular system) feedback provided by the controlled back and forth lateral deviations 340 indicate to the occupant of vehicle 100 that vehicle 100 is in an autonomous driving mode and that the autonomous driving mode is operating correctly, as discussed above.

Referring again to FIG. 3, in this scenario, feedback-generation module 230 has, over the illustrated portion of a roadway segment of roadway 310, selected a controlled lateral deviation 340a (to the right) followed by a controlled lateral deviation 340b (to the left). Though not shown in FIG. 3, this pattern of controlled back and forth (i.e., alternating between a deviation in one direction and then the other) lateral deviations 340 from the reference path 335 can be extended (repeated) along the entire length of the roadway segment. Feedback-generation module 230, via autonomous driving module(s) 160, executes the intentional, controlled back and forth lateral deviations 340 from the reference path 335 to generate the feedback for vehicle occupants, as discussed above.

In some embodiments, the controlled back and forth lateral deviations 340 are modeled in terms of a frequency of occurrence (i.e., a frequency at which adjustments in the heading of vehicle 100 are made) and a magnitude (the size of the deviation). The frequency of occurrence and magnitude can be dependent on factors such as how straight or curved the particular segment of roadway 310 is, the width of lane 320, the comparative width of a particular vehicle 100, the current speed at which the vehicle 100 is traveling, and traffic density (e.g., an urban vs. rural environment). For example, in a highway-driving situation along an approximately straight roadway segment at higher speed (e.g., 70 mph), the controlled back and forth lateral deviations 340 might occur at a rate of once every two seconds with a magnitude selected based on the width of the lane 320 and the comparative width of the vehicle 100. In some embodiments, the frequency is varied randomly within predetermined limits about an average frequency. In the example just mentioned, the frequency could vary randomly or pseudo-randomly between 1.7 s and 2.3 s with an average frequency of 2 s.

Generally speaking, the magnitude of the controlled back and forth lateral deviations 340 is selected to be large enough to provide the desired feedback to vehicle occupants without bringing vehicle 100 too close to either lane boundary 330. The magnitude of a controlled lateral deviation 340, in some embodiments, is expressed in terms of a momentary change or adjustment in steering angle relative to the reference path 335. For example, in the scenario depicted in FIG. 3, feedback-generation module 230 might specify a brief steering-angle change of a certain number of degrees to the right to cause vehicle 100 to follow the path indicated by controlled lateral deviation 340a in FIG. 3. Analogously, for controlled lateral deviation 340b, feedback-generation module 230 might specify a brief steering-angle change of a certain number of degrees to the left to cause vehicle 100 to follow the path indicated by controlled lateral deviation 340b in FIG. 3.

The frequency and magnitude of the controlled back and forth lateral deviations 340 can vary, depending on several factors, as discussed above. One factor mentioned above is how straight or curved the identified roadway segment is. The concept of applying controlled back and forth lateral deviations 340 relative to a reference path 335 in connection with the various embodiments described herein is primarily applicable to straight or approximately straight roadway segments. In one embodiment, feedback-generation module 230 considers a roadway segment to be approximately straight if steering/heading adjustments for vehicle 100 are not needed or are minimal for greater than a threshold number of seconds, based on data from sensor system 120 and/or map data 116.

In a curved portion of the roadway 310, feedback-generation module 230 can adjust the frequency and magnitude of controlled back and forth lateral deviations 340 to be small or even zero, depending on the embodiment. The reason is that curved segments of a roadway 310 already provide sufficient visual and kinesthetic (in combination with the vestibular system) feedback to vehicle occupants. It is along straight or approximately straight roadway segments that the kind of feedback provided by the controlled back and forth lateral deviations 340 described herein is helpful to vehicle occupants. Generalizing, in some embodiments, the controlled back and forth lateral deviations 340 are larger when the roadway segment is straight (or approximately straight) than when the roadway segment is curved. As mentioned above, the frequency and magnitude of the controlled back and forth lateral deviations 340 can be adjusted to zero or nearly zero along a curved roadway segment, in some embodiments.

In some embodiments, feedback-generation module 230 includes instructions that permit a user (e.g., operator or other occupant) of vehicle 100 to configure the frequency and/or the magnitude of the controlled back and forth lateral deviations 340 within predetermined limits. This can be accomplished through a suitable user interface (e.g., an integrated touchscreen-based user interface or a smartphone app) that communicates with feedback-generation module 230.

In some embodiments, feedback-generation module 230 selects the controlled back and forth lateral deviations 340 (e.g., whether they begin to the right or to the left, their frequency of occurrence, their magnitude, etc.), at least in part, to avoid a roadway obstacle. This is illustrated in FIG. 4.

Figure 4:
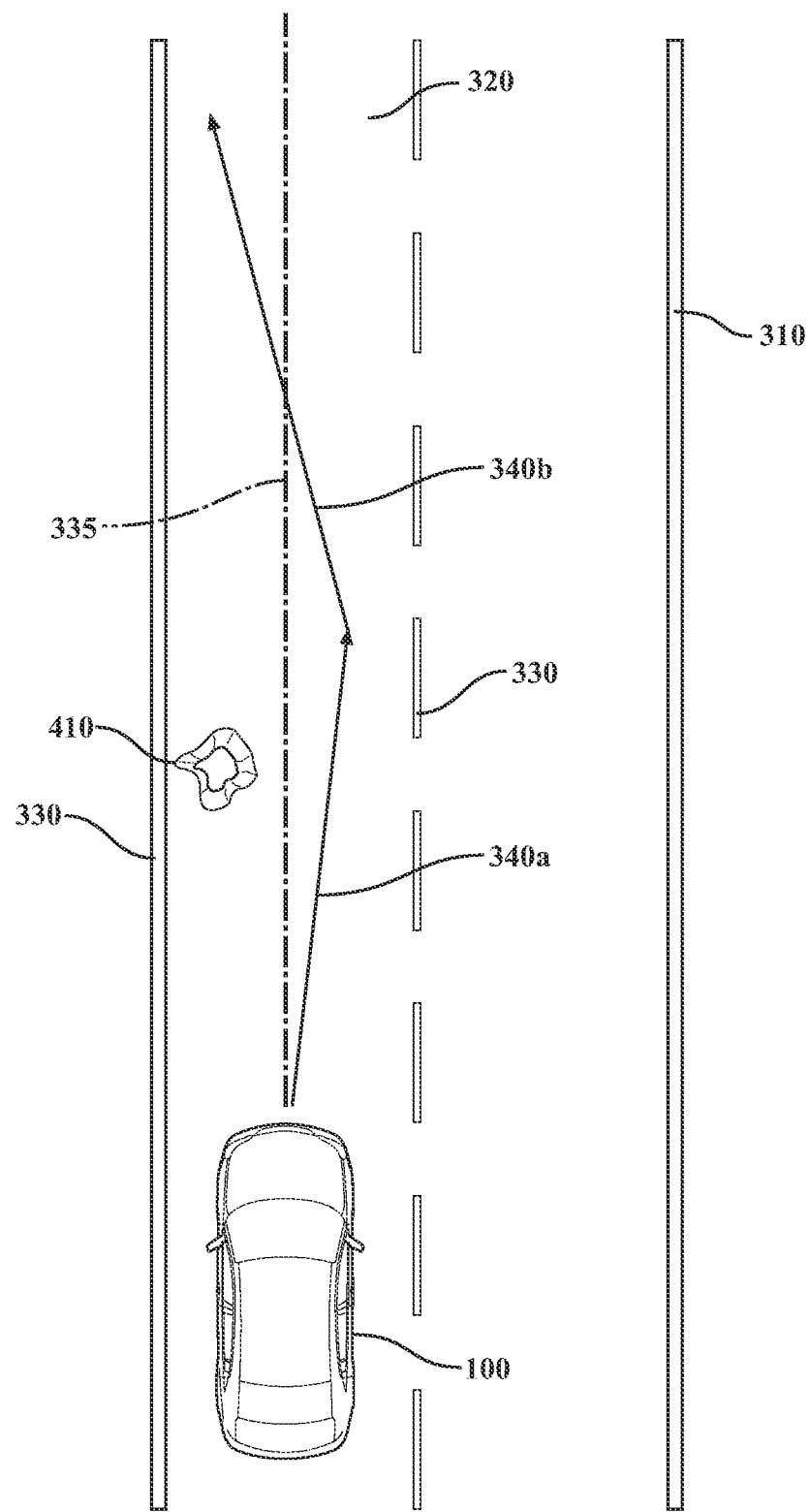
FIG. 4 illustrates the selection of controlled back and forth lateral deviations relative to a reference path that avoid a roadway obstacle, in accordance with an illustrative embodiment of the invention.

FIG. 4 illustrates the selection of controlled back and forth lateral deviations 340 relative to a reference path 335 that avoid a roadway obstacle 410, in accordance with an illustrative embodiment of the invention. In the scenario depicted in FIG. 4, feedback-generation module 230 selects controlled lateral deviation 340a followed by controlled lateral deviation 340b in a manner that avoids a pothole 410 (one example of a roadway obstacle).

In some embodiments, feedback-generation module 230 selects a direction in which the controlled back and forth lateral deviations 340 are initiated that avoids bringing vehicle 100 into closer proximity with a detected object in a region adjacent to the lane in which vehicle 100 is traveling. This is illustrated in FIG. 5.

Figure 5:
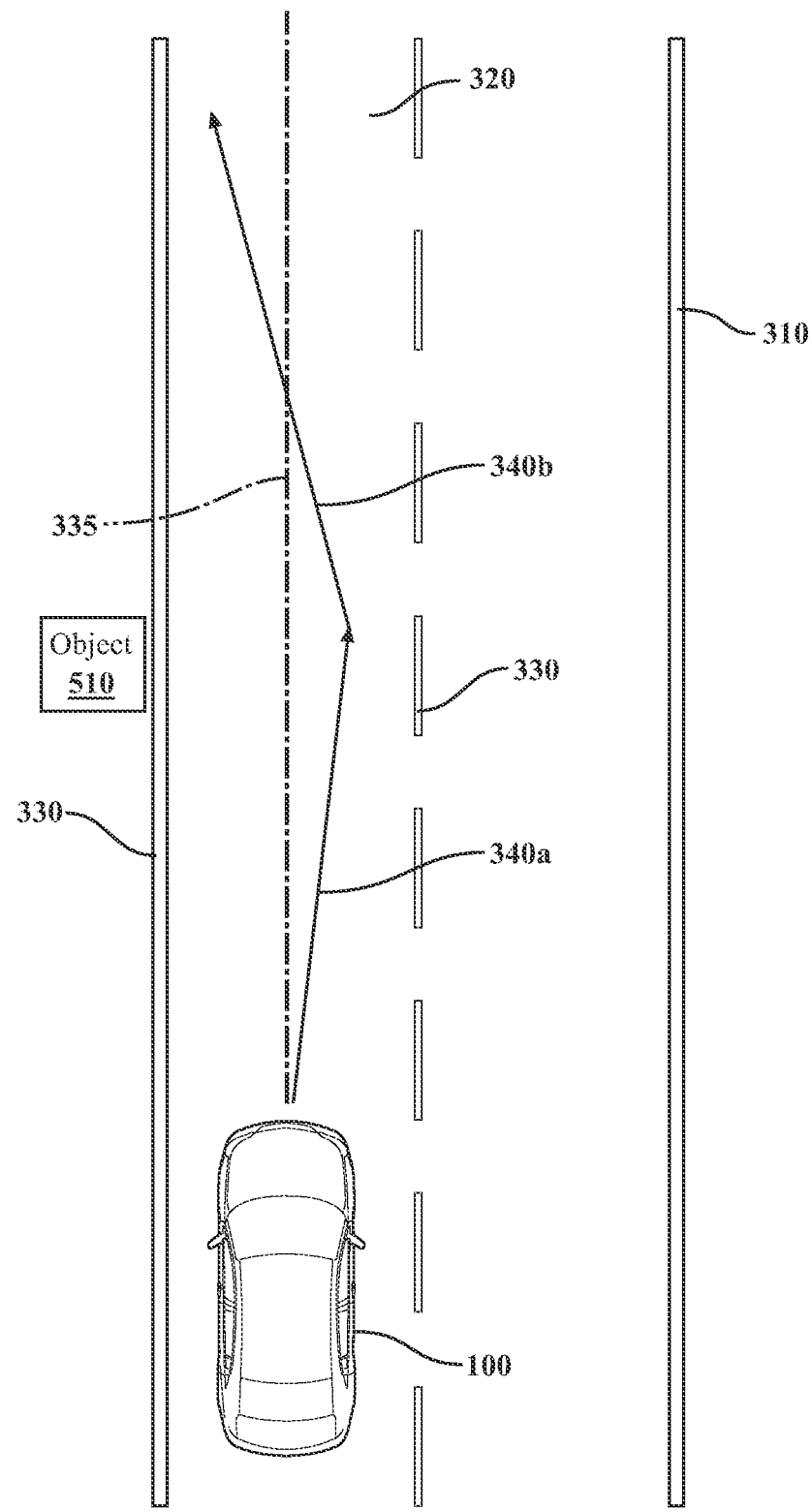
FIG. 5 illustrates the selection of controlled back and forth lateral deviations relative to a reference path that avoid bringing an autonomous vehicle into closer proximity with a detected object outside of but near a lane boundary, in accordance with an illustrative embodiment of the invention.

FIG. 5 illustrates the selection of controlled back and forth lateral deviations 340 relative to a reference path 335 that avoid bringing an autonomous vehicle into closer proximity with a detected object 510 outside of but near a lane boundary 330, in accordance with an illustrative embodiment of the invention. In the scenario depicted in FIG. 5, feedback-generation module 230 selects controlled lateral deviation 340a and controlled lateral deviation 340b in a manner that avoids bringing vehicle 100 too close to object 510 (e.g., a parked vehicle, foreign object on the side of the road, construction equipment, construction barrier, pedestrian, etc.). In this example, feedback-generation module 230 does so by choosing controlled lateral deviation 340a to the right first, followed by controlled lateral deviation 340b to the left. This choice of initial direction ensures that vehicle 100 does not pass unnecessarily or undesirably close to object 510.

In some embodiments, feedback-generation module 230 derives the controlled back and forth lateral deviations 340 from observed driving patterns of a particular human driver (e.g., the owner or principal operator of a vehicle 100) during periods when the vehicle 100 is in a manual driving mode in which the human driver controls the vehicle. In some embodiments, the controlled back and forth lateral deviations 340 are obtained from a model developed using machine-learning techniques. In other embodiments, the driving patterns of the particular human driver can be analyzed (e.g., via statistical analysis) to infer frequency and magnitude parameters, for example, that enable feedback-generation module 230 to mimic the particular driver's naturally occurring back and forth lateral deviations.

In some embodiments, the steering wheel of vehicle 100 is coupled with the controlled back and forth lateral deviations 340 produced by feedback-generation module 230 such that the steering wheel moves back and forth in synchronism with the steering adjustments that produce the controlled back and forth lateral deviations 340. In other embodiments, the steering wheel of vehicle 100 is decoupled from the controlled back and forth lateral deviations 340. That is, the steering wheel remains stationary (e.g., in a reference position corresponding to travel straight ahead, if the vehicle 100 were being manually driven) as the controlled back and forth lateral deviations 340 occur.

In some embodiments, feedback-generation module 230 combines controlled (intentional and bounded) variations in the speed of vehicle 100 with the controlled back and forth lateral deviations 340 from the reference path 335 to add another dimension to the feedback provided to vehicle occupants. This technique adds subtle longitudinal g-forces to the visual feedback and subtle lateral g-forces. Human drivers not employing cruise control do not drive at a perfectly constant speed, even on an uncrowded and straight stretch of highway, and the controlled speed variations mimic that naturally occurring variability in speed.

Figure 6:
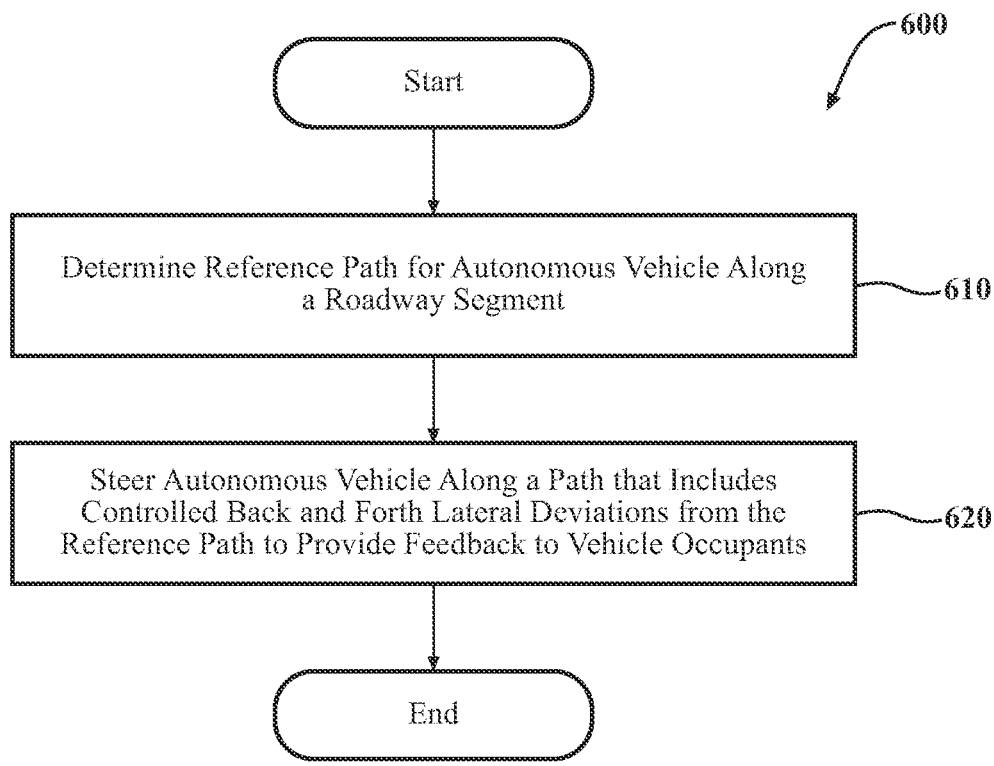
FIG. 6 is a flowchart of a method of controlling an autonomous vehicle, in accordance with an illustrative embodiment of the invention.

FIG. 6 is a flowchart of a method 600 of controlling the operation of an autonomous vehicle 100, in accordance with an illustrative embodiment of the invention. Method 600 will be discussed from the perspective of the autonomous driving feedback system 170 in FIG. 2. While method 600 is discussed in combination with autonomous driving feedback system 170, it should be appreciated that method 600 is not limited to being implemented within autonomous driving feedback system 170, but autonomous driving feedback system 170 is instead one example of a system that may implement method 600.

At block 610, path-planning module 220 determines a reference path 335 for a vehicle 100 along a roadway segment. As discussed above, in some embodiments the reference path 335 coincides, at least approximately, with an imaginary line that extends longitudinally along the center of the lane 320 in which the vehicle is traveling. As also discussed above, the reference path 335 may be termed the "normal" or "ideal" path for the vehicle 100 to follow over the course of the roadway segment.

At block 620, feedback-generation module 230 steers vehicle 100 along a path that includes controlled back and forth lateral deviations 340 from the reference path 335 along the roadway segment to provide feedback to an occupant of vehicle 100. As discussed above, the feedback indicates to an occupant of vehicle 100 that vehicle 100 is in an autonomous driving mode and that the autonomous driving mode is operating correctly. As discussed above, in some embodiments, the controlled back and forth lateral deviations 340 are modeled in terms of a frequency of occurrence and a magnitude. In some embodiments, a user can configure the frequency and/or magnitude, within predetermined limits.

As also discussed above, in some embodiments, the controlled back and forth lateral deviations 340 are larger when the roadway segment is straight (or approximately straight) than when the roadway segment is curved. As mentioned above, the frequency and magnitude of the controlled back and forth lateral deviations 340 can be adjusted to zero or nearly zero along a curved roadway segment, in some embodiments. In some embodiments, feedback-generation module 230 randomly varies, within predetermined limits, the frequency of occurrence of the controlled back and forth lateral deviations 340.

As also discussed above, in some embodiments, feedback-generation module 230 selects the controlled back and forth lateral deviations 340 (e.g., whether they begin to the right or to the left, their frequency, their magnitude, etc.), at least in part, to avoid a roadway obstacle 410 (e.g., a pothole). Also, in some embodiments, feedback-generation module 230 selects a direction in which the controlled back and forth lateral deviations 340 are initiated that avoids bringing vehicle 100 into closer proximity with a detected object 510 in a region adjacent to the lane 320 in which vehicle 100 is traveling.

As also discussed above, in some embodiments, feedback-generation module 230 derives the controlled back and forth lateral deviations 340 from observed driving patterns of a particular human driver, when the vehicle 100 is in a manual driving mode in which the human driver controls the vehicle. This can be done via machine learning or statistical analysis, for example, depending on the embodiment.

As also discussed above, in some embodiments, the steering wheel of vehicle 100 is coupled with the controlled back and forth lateral deviations 340 produced by feedback-generation module 230 such that the steering wheel moves back and forth in accordance with the controlled back and forth lateral deviations 340. In other embodiments, the steering wheel of vehicle 100 is decoupled from the controlled back and forth lateral deviations 340. That is, the steering wheel remains stationary as the controlled back and forth lateral deviations 340 occur.

As also discussed above, in some embodiments, feedback-generation module 230 includes further instructions to combine controlled variations in the speed of vehicle 100 with the controlled back and forth lateral deviations 340 to provide an additional kind of kinesthetic (in combination with the vestibular system) feedback (longitudinal g-forces) to the occupant(s) of vehicle 100.

FIG. 1 will now be discussed in full detail as an example vehicle environment within which the systems and methods disclosed herein may be implemented. In some instances, the vehicle 100 can be configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the vehicle 100 can be an autonomous vehicle. As used herein, "autonomous vehicle" refers to a vehicle that operates in an autonomous mode. "Autonomous mode" refers to navigating and/or maneuvering a vehicle along a travel route using one or more computing devices to control the vehicle with minimal or no input from a human driver/operator. In one implementation, the vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more implementations, the vehicle 100 operates autonomously according to a particular defined level of autonomy.

The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, vehicle 100 can receive sensor data from other connected vehicles, from devices associated with ORUs, or both.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the vehicle 100 itself, including the operational status of various vehicle components and systems.

In one or more arrangements, the vehicle sensors 121 can be configured to detect, and/or sense position and/or orientation changes of the vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a global positioning system (GPS), a navigation system 147, and /or other suitable sensors. The vehicle sensors 121 can be configured to detect, and/or sense one or more characteristics of the vehicle 100. In one or more arrangements, the vehicle sensors 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 and/or the autonomous driving module(s) 160 can be operatively connected to communicate with the various vehicle systems 140 and/or individual components thereof. For example, returning to FIG. 1, the one or more processors 110 and/or the autonomous driving module(s) 160 can be in communication to send and/or receive information from the various vehicle systems 140 to control the movement, speed, maneuvering, heading, direction, etc. of the vehicle 100. The one or more processors 110 and/or the autonomous driving module(s) 160 may control some or all of these vehicle systems 140 and, thus, may be partially or fully autonomous.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some implementations, the vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140). The noted functions and methods will become more apparent with a further discussion of the figures.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-6, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™ Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for controlling an autonomous vehicle, the system comprising:
   one or more processors; and
   a memory communicably coupled to the one or more processors and storing:
   a path-planning module including instructions that when executed by the one or more processors cause the one or more processors to determine a reference path for the autonomous vehicle along a roadway segment; and
   a feedback-generation module including instructions that when executed by the one or more processors cause the one or more processors to steer the autonomous vehicle along a path that includes controlled back and forth lateral deviations from the reference path along the roadway segment to provide feedback to an occupant of the autonomous vehicle, the feedback indicating to the occupant that the autonomous vehicle is in an autonomous driving mode and that the autonomous driving mode is operating correctly, wherein the controlled back and forth lateral deviations are larger when the roadway segment is straight than when the roadway segment is curved.

2. The system of claim 1, wherein the feedback-generation module includes instructions to select the controlled back and forth lateral deviations, at least in part, to avoid a roadway obstacle.

3. The system of claim 1, wherein the feedback-generation module includes instructions to derive the controlled back and forth lateral deviations from observed driving patterns of a particular human driver.

4. The system of claim 1, wherein the feedback-generation module includes instructions to select a direction in which the controlled back and forth lateral deviations are initiated that avoids bringing the autonomous vehicle into closer proximity with a detected object in a region adjacent to a lane in which the autonomous vehicle is traveling.

5. The system of claim 1, wherein the feedback-generation module includes instructions to vary randomly within predetermined limits a frequency of occurrence of the controlled back and forth lateral deviations.

6. The system of claim 1, wherein the feedback-generation module includes instructions to perform one of:
   coupling a steering wheel of the autonomous vehicle to move in accordance with the controlled back and forth lateral deviations; and
   decoupling the steering wheel from the controlled back and forth lateral deviations.

7. The system of claim 1, wherein the feedback-generation module includes instructions to enable a user to configure a frequency and a magnitude of the controlled back and forth lateral deviations within predetermined limits.

8. The system of claim 1, wherein the feedback-generation module includes further instructions to combine controlled variations in a speed of the autonomous vehicle with the controlled back and forth lateral deviations.

9. A non-transitory computer-readable medium for controlling an autonomous vehicle and storing instructions that when executed by one or more processors cause the one or more processors to:
determine a reference path for the autonomous vehicle along a roadway segment; and
steer the autonomous vehicle along a path that includes controlled back and forth lateral deviations from the reference path along the roadway segment to provide feedback to an occupant of the autonomous vehicle, the feedback indicating to the occupant that the autonomous vehicle is in an autonomous driving mode and that the autonomous driving mode is operating correctly, wherein the controlled back and forth lateral deviations are larger when the roadway segment is straight than when the roadway segment is curved.

10. A method of controlling an autonomous vehicle, the method comprising:
determining a reference path for the autonomous vehicle along a roadway segment; and
steering the autonomous vehicle along a path that includes controlled back and forth lateral deviations from the reference path along the roadway segment to provide feedback to an occupant of the autonomous vehicle, the feedback indicating to the occupant that the autonomous vehicle is in an autonomous driving mode and that the autonomous driving mode is operating correctly, wherein the controlled back and forth lateral deviations are larger when the roadway segment is straight than when the roadway segment is curved.

11. The method of claim 10, wherein the controlled back and forth lateral deviations are selected, at least in part, to avoid a roadway obstacle.

12. The method of claim 10, wherein the controlled back and forth lateral deviations are derived from observed driving patterns of a particular human driver.

13. The method of claim 10, wherein a direction in which the controlled back and forth lateral deviations are initiated is selected that avoids bringing the autonomous vehicle into closer proximity with a detected object in a region adjacent to a lane in which the autonomous vehicle is traveling.

14. The method of claim 10, wherein a frequency of occurrence of the controlled back and forth lateral deviations is varied randomly within predetermined limits.

15. The method of claim 10, wherein a steering wheel of the autonomous vehicle is one of coupled to move in accordance with the controlled back and forth lateral deviations and decoupled from the controlled back and forth lateral deviations.

16. The method of claim 10, wherein a user can configure a frequency and a magnitude of the controlled back and forth lateral deviations within predetermined limits.

17. The method of claim 10, further comprising combining controlled variations in a speed of the autonomous vehicle with the controlled back and forth lateral deviations.

* * * * *